Patented Nov. 9, 1926.

1,606,619

UNITED STATES PATENT OFFICE.

CARLETON ELLIS, OF MONTCLAIR, NEW JERSEY, ASSIGNOR TO CHADELOID CHEMICAL COMPANY, A CORPORATION OF WEST VIRGINIA.

BAKED JAPAN REMOVER.

No Drawing. Application filed April 27, 1922. Serial No. 556,827.

This invention relates to a composition intended for use in softening and removing enamel and baked japan coatings from automobile bodies, bicycle frames and other similar surfaces.

The invention is concerned with a composition comprising a hydrocarbon solvent preferably of a very readily volatile and penetrating character and an alcoholic body, all incorporated with caustic alkali and waxy evaporation retarding material. The present invention relates moreover to certain specific compositions and especially to a composition in which the caustic alkali is largely or wholly potassium hydroxide.

While the caustic alkalis, namely caustic potash and caustic soda are generally classed as equivalent substances, which is true for many purposes, in the present invention they have different properties and act differently to such an extent that they cannot be regarded as strictly equivalent. For example a saturated solution of caustic soda in ethyl alcohol when mixed with benzol will form a film probably due in part at least to the production of carbonate of soda at the surface of the exposed liquid. Potassium hydroxide on the other hand does not form such a film although it is quite likely that potassum carbonate is produced on exposure. Possibly the hygroscopic properties of potassium carbonate are in part responsible for this difference. Potassium hydroxide also is more soluble in alcohol than sodium hydroxide and a higher concentration of the potash compound therefore may be obtained without the presence in the mixture of a magma or precipitate of alkaline material and waxy substance which impair the quality of the remover or interfere with its uniformity.

The raw materials capable of use in a remover of the present character are quite limited in number. While a large number of solvents would appear to be applicable such is not the case. In one way or another defects or difficulties appear which restrict the solvents to only a few.

In the case of the alcoholic bodies ethyl alcohol is one of the best solvents to use in the present case as a carrier for the caustic alkali and as a loosening solvent for the enamel coating. Methyl alcohol however cannot be used to advantage, at least with concentrated solutions of caustic potash as these solutions are not readily miscible with desirable hydrocarbons. For example ordinary wood or methyl alcohol of say 95% strength saturated with caustic potash does not mix with benzol. If the dry alcohol is used a mixture may be effected but it is liable to separate on standing.

Acetone and other ketones which form desirable constituents of ordinary paint and varnish removers do not dissolve caustic soda or caustic potash and when allowed to stand in contact with these alkalis condensation products may form which are not always desirable.

Esters such as methyl or ethyl acetate will be saponified by the caustic alkali and the strength of the latter reduced. The same is true of grades of methyl acetone which contain saponifiable substances.

Phenols may be introduced but for most purposes have no material advantage. Thus carbolic acid will unite with the caustic alkali to form sodium phenate.

Of the available hydrocarbons, benzol is the most desirable but toluol or even heavier aromatic hydrocarbons may be used. Gasoline and similar petroleum hydrocarbons have a poor solvent effect and do not make satisfactory homogeneous solutions in many cases. Ethers may be used to some extent. Carbon bisulphide on the other hand although a powerful solvent is attacked by caustic alkali.

The wax preferably employed is an unsaponifiable type such as paraffin or ceresin wax. The latter is better for the production of a smooth paste form of remover but the paraffin wax when used in lesser quantity affords a more liquid form of remover which is fully as rapid in action. Waxes such as beeswax, candelilla wax, carnauba wax and the like which are acted upon by alkali are not employed as advantageously. An unsaponifiable wax preferably a hard paraffin affords the most desirable results.

Other thickening agents such as soaps and the like may be employed in so far as they are compatible with the alkali used.

The proportion of alcoholic body to hydrocarbon is also a consideration, the more alcohol present the greater the softening and loosening effect as a rule. This is advantageous as it causes wrinkling of the surface aiding in the more ready removal of the enamel coating.

On the other hand enough wax solvent preferably should be present to maintain a sufficient quantity of wax in solution or quasi solution to readily form an evaporation retarding film. Besides this the solvent effect of a mixture of alcohol and benzol is considerably greater in many cases than the individual solvents.

Preferably a larger proportion of alcohol than of benzol is used as for example two volumes of alcohol to one of benzol. On the other hand removers may be made with the benzol in preponderance. As benzol is usually cheaper than alcohol a remover may be made in this way at somewhat less cost.

A rather remarkable feature about a composition of this type is that the caustic alkali which is insoluble in benzol but readily soluble in alcohol does not appear to be thrown down from the solution in alcohol on the addition of benzol. Hence saturated alcoholic solutions of the caustic alkali may be used. The best results are obtained by using such high concentrations, the activity of the remover being lessened as the alkali is decreased.

The composition may have added to it ammonia in the form of ammonia gas to saturation or to a lesser degree; however the use of ammonia gives rise to the unpleasant odor and the action of ammonia gas on the eyes of the operator. It is not therefore recommended for general use.

A non-inflammable solvent such as carbon tetrachloride and other chlorinated solvents may be used in some cases but some of these are considerably acted upon by caustic alkali, carbon tetrachloride being an illustration. Chlorbenzol however is not thus acted upon and may be used when desired to reduce the inflammability to some extent.

For the removal of enamel from aluminum automobile bodies a dry composition is desirable and the composition may be prepared advantageously in some cases by adding a small amount of metallic potassium or sodium thereby taking up the water and forming caustic potash or caustic soda. Calcium carbide also may be used as a drying agent but involves filtration to remove the lime residues.

In the present invention particularly in its preferred form it is an object to produce a composition which is largely free from suspensions or deposits of mineral matter. A composition which is clogged with such mineral salts has a retarding action on the active ingredients. A composition which has the alkali practically in complete solution and which has only a small amount of precipitated wax is recommended.

It will be seen that the solvent or cutting portion of the remover is a homogeneous solution, as distinguished from a coarse emulsion which readily separates. The precipitated or semi-colloidal wax remains well mixed with the cutting liquid. This condition is hereinafter included in the expression "containing precipitated wax", but otherwise substantially homogeneous.

I have used advantageously alcoholic solutions having concentrations of caustic soda 130 grams per liter and in the case of caustic potash about 200 grams per liter. These concentrations represent approximately saturated solutions and such highly concentrated solutions form a preferred feature of my invention. Such alkaline solutions are preferably largely or entirely miscible with the benzol or other hydrocarbon employed. The addition of wax should not cause any undesirable separation. In the case of methyl alcohol concentrated caustic soda solution thereof even when free from water tends very readily to separate on the addition of wax to a benzol, methyl alcohol-caustic soda mixture. Acetone in like manner causes caustic soda to precipitate from alcohol benzol solution lowering the concentration of the alkali. Toluol although quite similar to benzol is slower in its action ordinarily requiring from fifteen to twenty per cent longer time than benzol when used in removers of this character.

The solvents used herein may be either the pure materials or their various commercial forms as for example denatured alcohol and benzol of commercial purity.

As an illustration of a highly active composition for removing baked japan I cite the following.

Saturated solution of caustic potash in denatured alcohol 70 parts, benzol 30 parts, paraffin wax 3¾ parts.

The preferred method of mixing these materials is to dissolve the caustic potash in the alcohol. Melt the wax and dissolve it in the benzol. Then mix the two solutions. The proportions given are by volume.

Other methods of mixing may be used as for example the requisite amounts of the materials may be mixed all together cold or hot.

Another formula in the following: Saturated solution of caustic potash in denatured alcohol 50 parts, benzol 50 parts, paraffin wax 6 to 8 parts. The proportion of paraffin wax preferably is varied with respect to the amount of benzol used. The latter is a powerful wax solvent while the alcoholic potash acts as a wax precipitant. By adjusting the proportions of the solvent material the wax is held in a state of solution or suspension under conditions such that an evaporation retarding film readily forms. Only a very few per cent of wax is necessary for the purpose but additional wax may be used to give greater body for application to vertical surfaces.

The preferred embodiment of the invention comprehends the use of caustic potash as the sole alkali, rather than caustic soda. Of course small additions or impurities of other alkalis not unfavorably influencing the speed of the remover may be disregarded. Heavy alkaline deposits are undesirable because they bulk the remover without adding effective solvent material.

A clear or turbid solution or a thin cream or paste of substantially homogeneous quality (except for separated or suspended wax) is desired in the preferred form of this type of remover.

What I claim is:—

1. A baked japan or enamel remover comprising benzol, denatured alcohol, caustic potash in such amount as to form a relatively concentrated solution with the quantity of alcohol present, and paraffin wax, in the form of a mixture which, except for the turbidity caused by the wax is homogeneous.

2. A baked japan or enamel remover comprising benzol, denatured alcohol, wax and a quantity of caustic potash equivalent in amount to that required to make a substantially saturated solution in the amount of alcohol employed.

3. A baked japan or enamel remover comprising benzol, saturated alcoholic potash solution and a wax, the latter being in amount sufficient to form an evaporation-retarding film, said remover being substantially free from alkaline deposits.

4. A baked japan or enamel remover comprising wax carried in a mixture of benzol and a substantially saturated caustic potash solution in a solvent consisting largely of ethyl alcohol, such composition being substantially free from alkaline deposits.

5. A liquid composition adapted as an enamel remover, comprising benzol, ethly alcohol, wax and caustic potash, the composition being substantially homogeneous and the components being in such proportions as to readily attack and loosen baked japan and enamel.

6. A baked japan or enamel removing composition comprising a volatile hydrocarbon solvent of the aromatic series, ethyl alcohol, wax and a quantity of caustic potash equivalent in amount to that required to make a saturated solution in the amount of alcohol employed; said composition being substantially homogeneous except for turbidity due to the presence of wax.

7. A composition suitable for removing enamel from surfaces which comprises benzol, a highly concentrated alcoholic potash solution and wax, forming a miscible substantially homogeneous product, and the components being in such proportions as to readily attack and loosen baked japan and enamel.

8. A removing composition of a substantially homogeneous character adapted for removing enamel comprising a volatile aromatic hydrocarbon solvent and highly concentrated alcoholic potash solution miscible therewith, such composition being capable of readily removing baked japan and enamel coatings.

9. A removing composition adapted for use as an enamel remover comprising a homogeneous mixture of a light volatile aromatic hydrocarbon solvent, a concentrated alcoholic potash solution wholly miscible therewith and waxy material.

10. A composition of matter comprising wax, benzol, alcohol and caustic alkali, said composition being miscible, substantially free from alkaline deposits, but exhibiting turbidity due to the presence of wax but otherwise substantially homogeneous and capable of readily removing baked japan and enamel coatings.

CARLETON ELLIS.